(12) United States Patent
Tokumitsu et al.

(10) Patent No.: US 7,459,895 B2
(45) Date of Patent: Dec. 2, 2008

(54) POWER CIRCUIT

(75) Inventors: Atsunori Tokumitsu, Chuo-ku (JP); Takeshi Naka, Chuo-ku (JP)

(73) Assignees: Torex Device Co., Ltd., Tokyo (JP); Device Engineering Co., Ltd., Tokyo (JP)

( * ) Notice: Subject to any disclaimer, the term of this patent is extended or adjusted under 35 U.S.C. 154(b) by 158 days.

(21) Appl. No.: 11/260,089

(22) Filed: Oct. 28, 2005

(65) Prior Publication Data

US 2006/0091866 A1    May 4, 2006

(30) Foreign Application Priority Data

Oct. 29, 2004    (JP) ............... 2004-316041

(51) Int. Cl.
   *G05F 3/16*    (2006.01)
(52) U.S. Cl. .................................... 323/316
(58) Field of Classification Search ............... 323/280, 323/315, 316, 317
   See application file for complete search history.

(56) References Cited

U.S. PATENT DOCUMENTS 4,837,495 A * 6/1989 Zansky ..................... 323/222
7,208,924 B2 * 4/2007 Toyoshima et al. ......... 323/271

FOREIGN PATENT DOCUMENTS

| JP | 10-214121 A | 8/1998 |
|---|---|---|
| JP | 2002-149245 A | 5/2002 |
| JP | 2003-52170 A | 2/2003 |
| JP | 2004-80985 A | 3/2004 |
| JP | 2004-153724 A | 5/2004 |
| JP | 2004-318407 A | 11/2004 |
| JP | 2005-196233 A | 7/2005 |

OTHER PUBLICATIONS

Communication from Japanese Patent Office.

* cited by examiner

*Primary Examiner*—Shawn Riley
(74) *Attorney, Agent, or Firm*—Sughrue Mion, PLLC (57) ABSTRACT

In a power circuit which makes phase compensation by utilizing ESR of an output capacitor, a feedback signal based on an output voltage is supplied by a coupling capacitor to an N-channel MOS transistor on a saturated coupling side of a current mirror circuit inside an error amplification circuit.

7 Claims, 10 Drawing Sheets

PRIOR ART

PRIOR ART

FIG.16A

PRIOR ART

FIG.16B

POWER CIRCUIT

BACKGROUND OF THE INVENTION

1. Field of the Invention

This invention relates to a power circuit and, more particularly, that useful when applied in using a low ESR (equivalent series resistance) capacitor as an output capacitor.

2. Description of the Related Art

Figure 11:
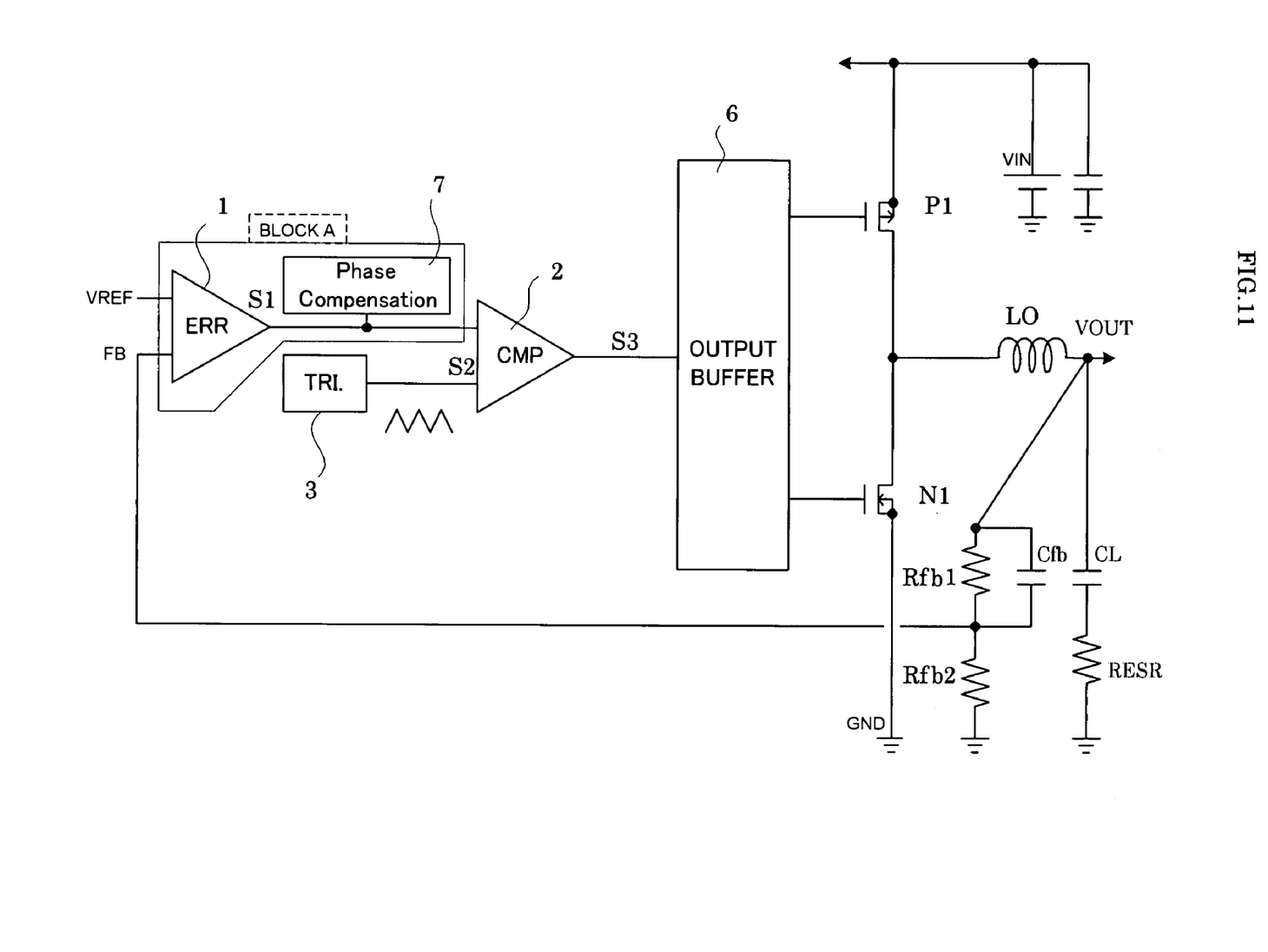
FIG. 11 is a block diagram showing the whole of a step-down DC-DC converter which is one of representative power circuits.

FIG. 11 is a block diagram showing the whole of a step-down DC-DC converter, which is one of representative power circuits. As shown in the drawing, an error amplifier 1 makes a comparison between a reference voltage VREF, which represents a preset voltage value, and a feedback signal FB, and delivers an error signal S1 which represents a deviation between VREF and FB. The feedback signal FB is obtained by dividing an output voltage VOUT by feedback resistances Rfb1 and Rfb2.

A comparator 2 compares the error signal S1 with an output signal S2 of a circuit 3, which generates a triangular wave, and sends out a duty signal S3 which determines the duty ratio of the output voltage VOUT of the DC-DC converter, namely, an output voltage value. The duty signal S3 controls the ON-OFF times of a P-channel MOS transistor P1 and an N-channel MOS transistor N1 via an output buffer circuit 6. This control determines the value of the output voltage VOUT based on an input voltage VIN.

A reactance L0 and an output capacitor CL having an equivalent series resistance component RESR function to smooth the output voltage VOUT.

A phase compensation circuit 7 makes the phase compensation of the error amplifier 1. As FIG. 12, which is an extracted view of portions in the neighborhood of the phase compensation circuit 7, shows in detail, the phase compensation circuit 7 consists of a resistance Rz and a capacitor Cz connected in series, and is connected to the output side of the error amplifier 1 which is a transconductance amplifier.

Figure 12:
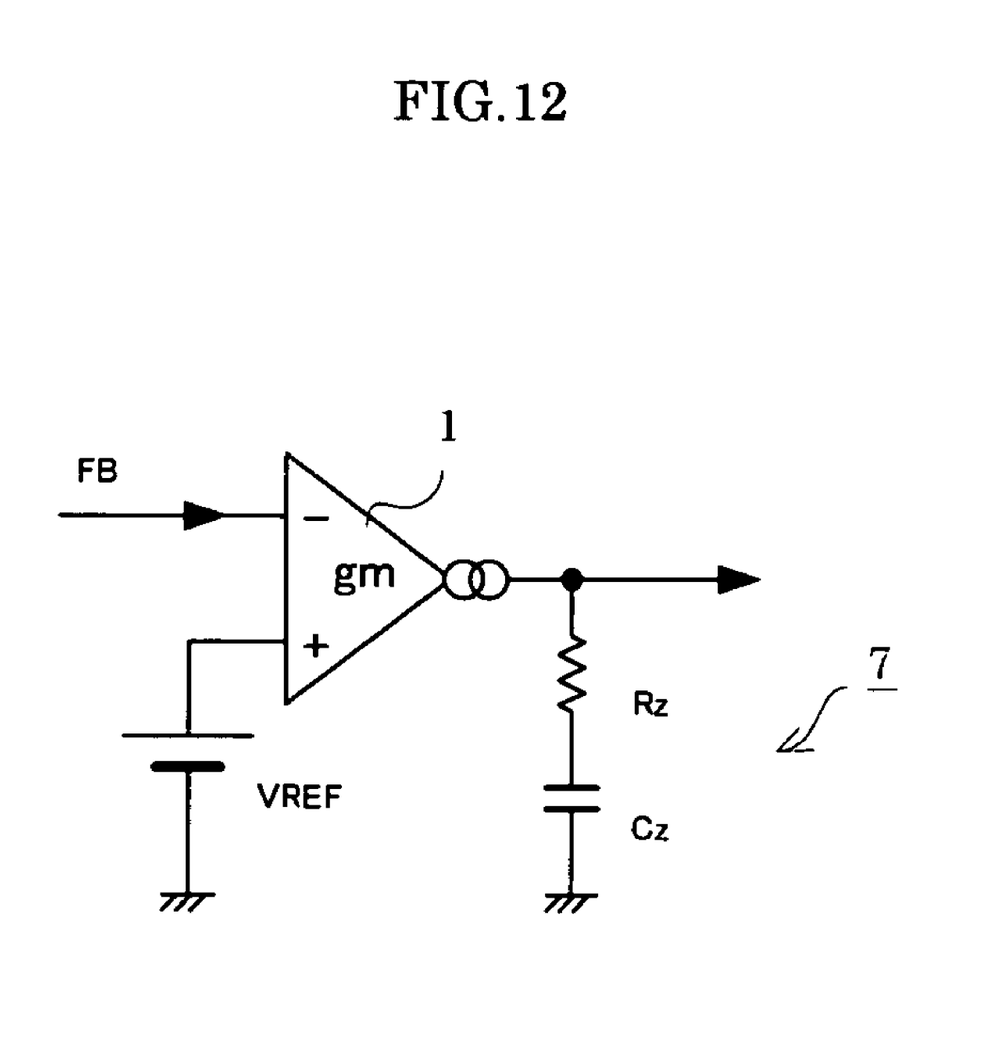
FIG. 12 is a circuit diagram showing a concrete example of the phase compensation circuit of FIG. 11.

The DC-DC converter in the above configuration manages a gain Az and a zero-point frequency fz (frequency at a point where the phase returns by 45 degrees) in the high frequency region of the error amplifier 1, and combines these parameters with a zero-point frequency fzfb which is determined by the capacitance of a feedback capacitor Cfb connected in parallel with the feedback resistance Rfb1 determining the output voltage VOUT, thereby dealing with abnormal oscillations.

The above parameters Az, fz, and fzfb are expressed by the following equations (1), (2) and (3):

$$Az = gm \times Rz \qquad (1)$$

$$fz = \frac{1}{2\pi \times Cz \times Rz} \qquad (2)$$

$$fzfb = \frac{1}{2\pi \times Cfb \times Rfb1} \qquad (3)$$

Figure 13:
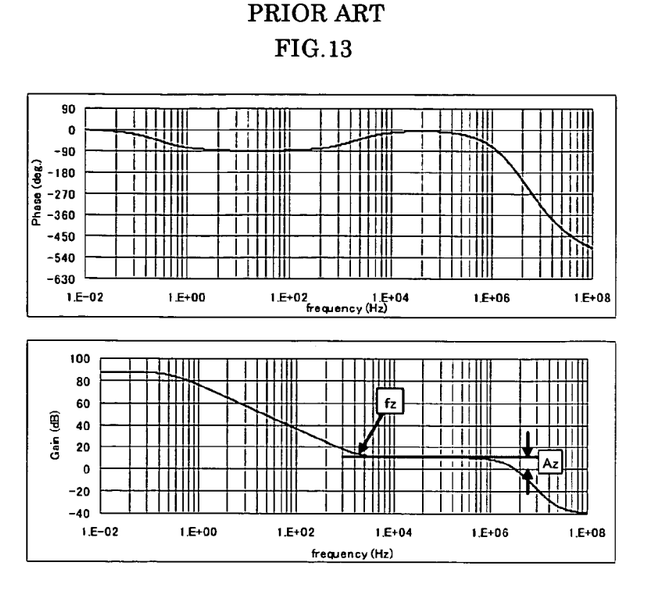
FIG. 13 is a Bode diagram showing the phase and gain characteristics of an error amplifier shown in FIG. 12 which has been subjected to phase compensation.

FIG. 13 shows a Bode diagram on the output side of the error amplifier 1 drawn when phase compensation was performed by the phase compensation circuit 7 shown in FIG. 12.

Figure 14:
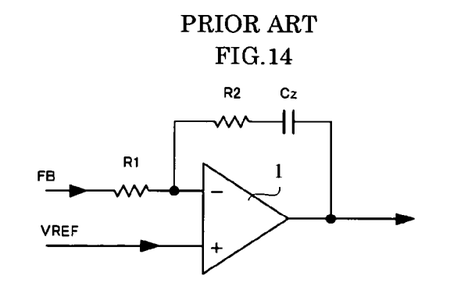
FIG. 14 is a circuit diagram showing another example of the phase compensation circuit.

FIG. 14 is a circuit diagram showing another example of the phase compensation circuit 7. The gain Az and the zero-point frequency fz in this case are expressed by the following equations (4) and (5):

$$Az = -\frac{R2}{R1} \qquad (4)$$

$$fz = \frac{1}{2\pi \times Cz \times R2} \qquad (5)$$

Figure 15:
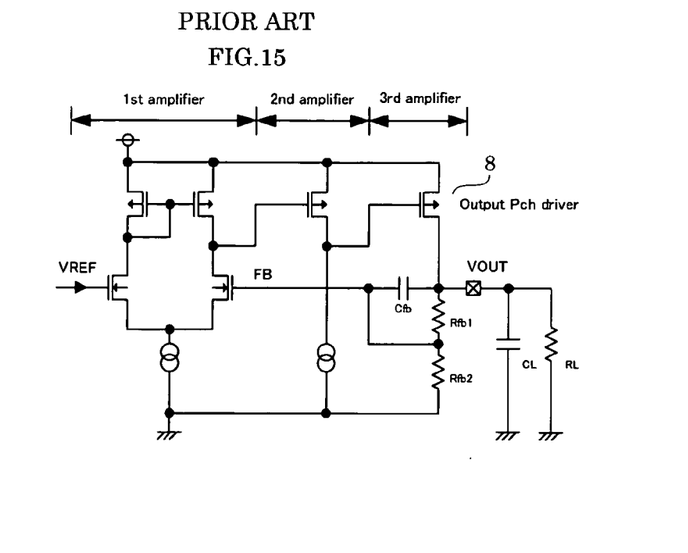
FIG. 15 is a circuit diagram showing a voltage regulator using a three-stage amplification method according to an earlier technology.

With a voltage regulator using a three-stage amplification method according to a conventional technology shown in FIG. 15, on the other hand, phase compensation is performed based on the frequency of a pole at each amplification stage, and a zero-point frequency fzfb determined by a feedback resistance Rfb1 and a feedback capacitor Cfb.

Assume here that the gain Az and phase are to be set so that the voltage regulator does not oscillate. For this purpose, the zero-point frequency fzfb needs to be set in the vicinity of the frequency of the second pole, at which the phase lags by 180°, whereby phase compensation is carried out. Also, the frequency of the third pole needs to be set at such a high frequency as not to influence, in terms of phase, a crossover frequency f0 at which the total gain of the voltage regulator is zero. However, in consideration of the Tr size of an output Pch driver 8 of the 3rd amplifier, the 2nd amplifier needs to drive a very great load capacitance. Moreover, the 3rd amplifier depends on an output impedance RL and a load capacitance CL external to an IC constituting the voltage regulator and, thus, its pole cannot be set at a high frequency. Hence, the pole of the 1st amplifier needs to be set on as high a frequency side as possible.

Furthermore, PSRR (power supply voltage rejection ratio) is named as an important factor for the high speed operation of the voltage regulator. To improve the PSRR characteristics, there is need to increase the total gain of the voltage regulator. In order to keep the phase margin adequate and, at the same time, increase the total gain, it is necessary to render the pole frequency of the 1st amplifier even higher. However, it is very difficult to control the pole of the 1st amplifier by the total gain.

With the aforementioned power circuit, on the other hand, it is common practice to create a zero-point frequency fzcl by the capacitance (CL) of the output capacitor CL and the resistance component (RESR) of the equivalent series resistance ESR, and carry out phase compensation based thereon.

The zero-point frequency fzcl in this case is expressed by the following equation (6):

$$fzcl = \frac{1}{2\pi \times CL \times RESR} \qquad (6)$$

As the above equation (6) shows, when a ceramic capacitor or the like, which is a low ESR capacitor, is used as the output capacitor CL, the zero-point frequency fzcl is high, and may be higher than a frequency which requires phase compensation. Therefore, the ceramic capacitor, if unchanged, may be unusable.

A tantalum capacitor or an electrolytic capacitor is known as the output capacitor Cl which can bring the zero-point frequency fzcl into a predetermined frequency region, and which is not a low ESR capacitor.

However, if the output capacitor CL having a large resistance component (RESR), such as a tantalum capacitor or an electrolytic capacitor, is used, a great ripple component is contained in the output voltage VOUT of the power circuit.

In earlier technologies, therefore, a ceramic capacitor with low ESR is used as the output capacitor CL, and a current feedback is given to make up for phase compensation which becomes inadequate because the equivalent series resistance component RESR is decreased in this case. Alternatively, the total gain is decreased to deteriorate overall performance, thereby coping with the problem.

Figure 16A:
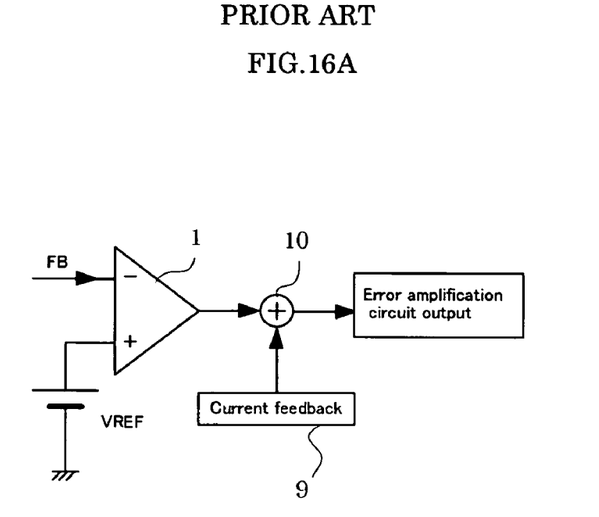
FIGS. 16A and 16B are circuit diagrams showing phase compensation circuits using current feedback circuits according to an earlier technology.
Figure 16B:
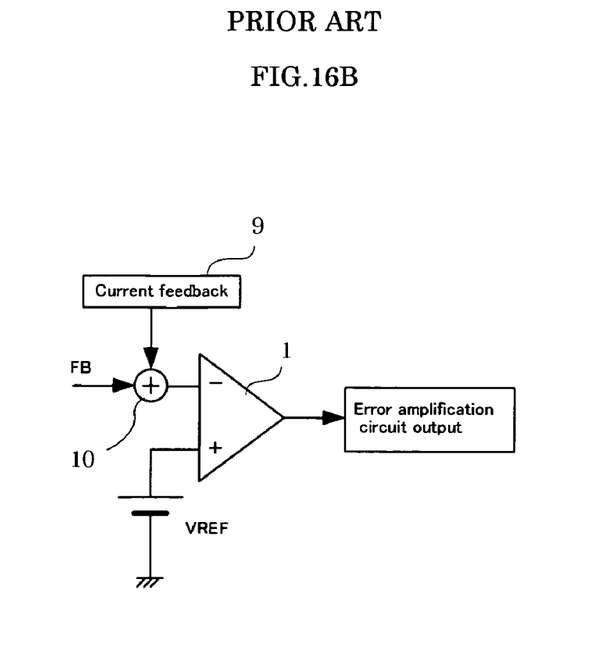

FIGS. 16A and 16B are circuit diagrams showing phase compensation circuits each using a current feedback circuit. As shown in these drawings, if a low ESR ceramic capacitor is used as the output capacitor CL (see FIG. 11), current feedback 9 is performed for compensating for phase compensation which is inadequate because of low RESR. At this time, a summing circuit 10 is added to the output side of the error amplifier 1. As a result of this addition, the scale of the circuit grows, posing the problems of an increase in the chip area, and an increase in the number of the circuit elements, leading to increased current consumption.

A document teaching publicly known technologies concerned with the present invention is, for example, as follows:

Japanese Patent application Laid-Open No. 2004-153724.

As described above, power circuits generally perform phase compensation by utilizing the ESR of the output capacitor CL. If the capacitor of low ESR, which makes inadequate phase compensation, is used, a complicated circuit for current feedback 9 needs to be added in order to stabilize the system.

SUMMARY OF THE INVENTION

The present invention has been accomplished in the light of the above-described earlier technologies. It is an object of the present invention to provide a power circuit which can stabilize the phase system, without using a complicated current feedback circuit, even if a low ESR capacitor is used as an output capacitor in the power circuit.

A first aspect of the present invention for attaining the above object is a power circuit which compares a feedback signal based on an output voltage with a preset reference signal by an error amplifier to output a predetermined voltage, and wherein the feedback signal is supplied to a transistor on a saturated coupling side of a current mirror circuit inside the error amplifier via a coupling capacitor.

A second aspect of the present invention is the power circuit according to the first aspect, characterized in that the coupling capacitor is connected to the transistor on the saturated coupling side via a resistance.

A third aspect of the present invention is the power circuit according to the first aspect, characterized in that a signal comprising a voltage converted from information on a current flowing in an output driver is used as the feedback signal.

In the first aspect, the feedback signal based on the output voltage is supplied to the interior of the error amplifier via the coupling capacitor. Thus, the stabilization of the phase system can be easily achieved without using a complicated current feedback circuit according to the earlier technology. That is, a ceramic capacitor with low ESR can be used, and a power circuit with small ripples can be provided with satisfactory output stability.

In the second aspect, the zero-point frequency can be set at an arbitrary point in a low frequency region.

In the third aspect, a highly stable power circuit, which ensures an ample phase margin responsive to a sharp change in a load current, can be achieved.

BRIEF DESCRIPTION OF THE DRAWINGS

For a more complete understanding of the present invention and the advantages thereof, reference is now made to the following descriptions in conjunction with the accompanying drawings.

DESCRIPTION OF THE PREFERRED EMBODIMENTS

Embodiments of the present invention will now be described in detail with reference to the accompanying drawings. The same portions as those in the earlier technologies shown in FIGS. 11 to 16A, 16B will be assigned the same numerals and symbols as those in the earlier technologies, and duplicate explanations will be omitted.

First Embodiment

Figure 1:
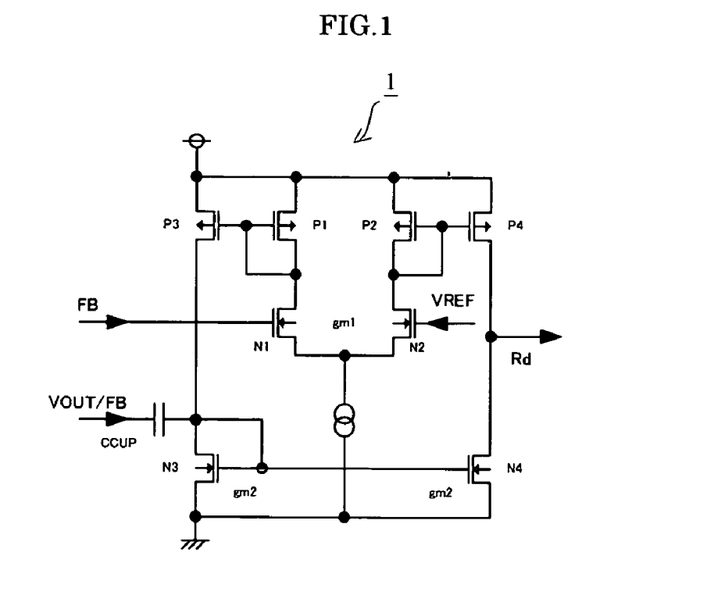
FIG. 1 is a circuit diagram showing, in an extracted manner, portions in the neighborhood of an error amplifier in a power circuit according to a first embodiment of the present invention.

FIG. 1 is a circuit diagram showing, in an extracted manner, portions in the neighborhood of an error amplifier 1 in a power circuit which performs phase compensation by use of ESR of an output capacitor CL as shown, for example, in FIG. 11. As shown in FIG. 1, the power circuit according to the present embodiment is constituted to supply a feedback signal VOUT/FB based on its output voltage VOUT (namely, a signal as a direct feedback of the output voltage VOUT, or a feedback signal FB) to an N-channel MOS transistor N3 on the saturated coupling side of a current mirror circuit inside the error amplifier 1 via a coupling capacitor CCUP which performs capacitive coupling of VOUT/FB. The error amplifier 1 in the present embodiment is composed of a transconductance amplifier. The saturated coupling refers to the short-circuiting of a drain and a gate.

According to the present embodiment described above, the output signal concerned with the output voltage VOUT or the output current is transmitted by the coupling capacitor CCUP to the N-channel MOS transistor N3 on the saturated coupling side of the current mirror circuit which can be a signal path, whereby phase characteristics in the high frequency region can be improved. That is, the zero-point frequency fzcp in the present embodiment is determined by the transconductance gm2 of the N-channel MOS transistor N3 on the saturated coupling side and the capacitance (CCUP) of the coupling capacitor CCUP, and is expressed by the equation (7) indicated below. A gain characteristic Azcp by the coupling capacitor CCUP at the zero-point frequency fzcp or higher is expressed by the following equation (8), where Rd stands for the output resistance of the error amplifier 1.

$$fzcp = \frac{gm2}{2\pi \times (CCUP)} \quad (7)$$

$$Azcp = gm2 \times Rd \quad (8)$$

Second Embodiment

The zero-point frequency fzcp in the first embodiment depends on the transconductance gm2 of the N-channel MOS transistor N3 in view of the equation (7). The transconductance gm2 is a parameter determined by the process, although its variations by manufacturing are small. Thus, it is difficult to control the zero-point frequency fzcp to an arbitrary frequency on the low frequency side.

Figure 2:
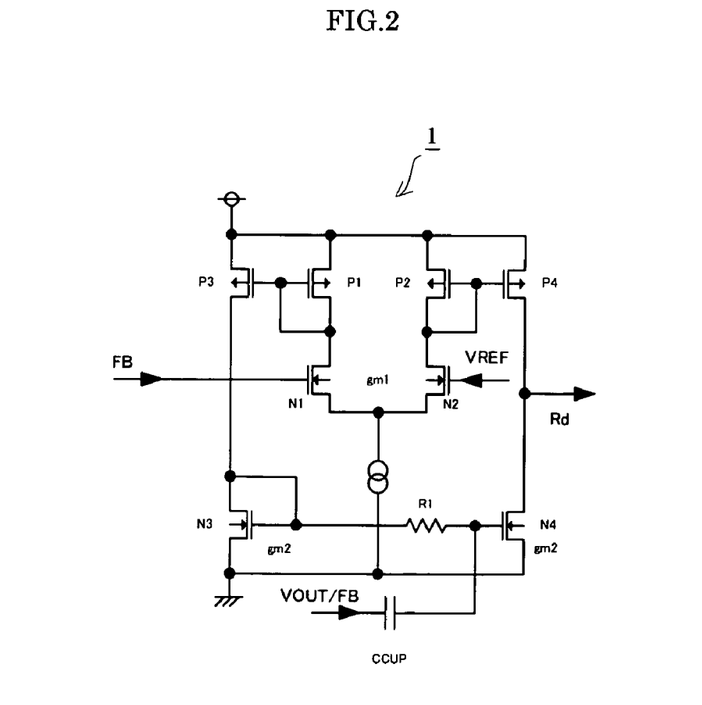
FIG. 2 is a circuit diagram showing, in an extracted manner, portions in the neighborhood of an error amplifier in a power circuit according to a second embodiment of the present invention.

The present embodiment is designed to solve the above problem and be able to control the zero-point frequency fzcp easily. That is, as shown in FIG. 2, the present embodiment is constituted such that a resistance R1 is connected between the gates of N-channel MOS transistors N3 and N4 constituting a current mirror circuit, and the coupling capacitor CCUP capacitively couples the feedback signal VOUT/FB is connected to the N-channel MOS transistor N3 on the saturated coupling side of the current mirror circuit via the resistance R1.

A zero-point frequency fzcp2 in the present embodiment can be expressed by the following equation (9) or (10):

$$fzcp2 = \frac{1}{2\pi \times (CCUP) \times (R1 + 1/gm2)} \quad (9)$$

$$\cong \frac{1}{2\pi \times (CCUP) \times R1} \quad (10)$$

Reference to the equation (10) shows that the addition of the resistance R1 enables the zero-point frequency fzcp2 to be set at an arbitrary point in a low frequency region. The zero-point frequency fzcp2 can be expressed by the equation (9) but, if R1 is sufficiently great compared with 1/gm2, the equation (10) holds.

Third Embodiment

As a way of withdrawing the output voltage VOUT, it is possible to convert a load current, which flows in an output driver transistor, into a voltage, and give feedback on its signal for phase compensation. By so utilizing current information, response to a load change can be improved.

Figure 3A:
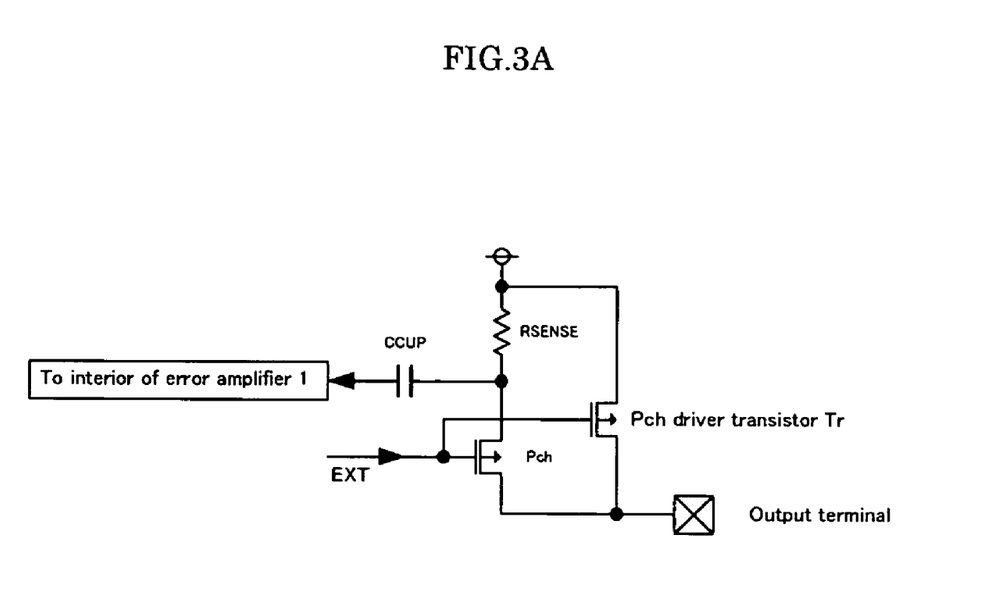
FIGS. 3A and 3B are circuit diagrams showing current feedback systems in power circuits according to a third embodiment of the present invention.
Figure 3B:
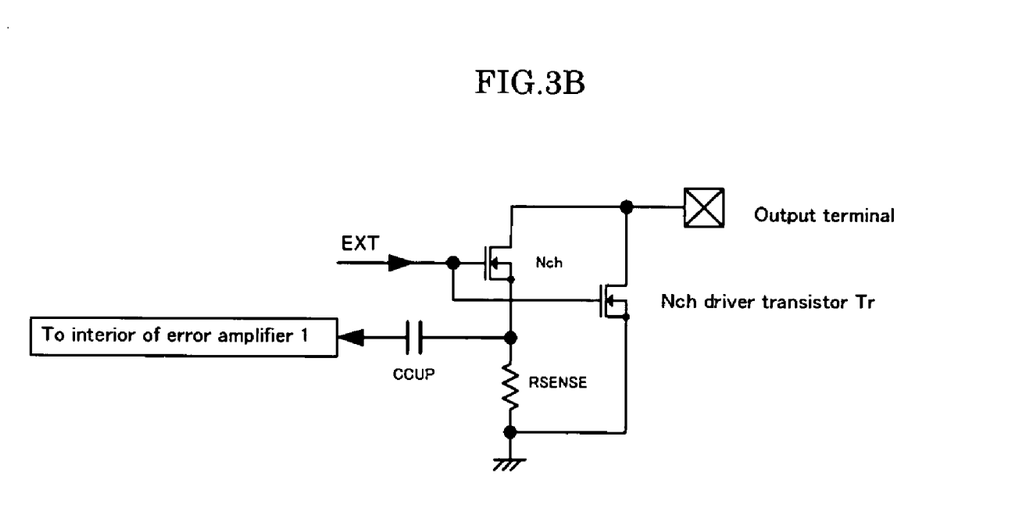

Circuits according to the present embodiment are shown in FIGS. 3A and 3B. In the circuit shown in FIG. 3A, a resistance RSENSE and a Pch transistor are connected in parallel with a Pch driver transistor Tr, and feedback is given by a coupling capacitor CCUP to the interior of an error amplifier 1. Because of this configuration, a current feedback circuit can be constructed easily.

Similarly, in the circuit shown in FIG. 3B, a drain voltage of an Nch driver transistor Tr can be used as a feedback signal. This is because the drain voltage in the ON state of the Nch driver transistor Tr is proportional to a load current and the ON resistance of the Nch driver transistor Tr, and the amount of feedback responsive to the load current can be set.

Other Embodiments

Figure 4:
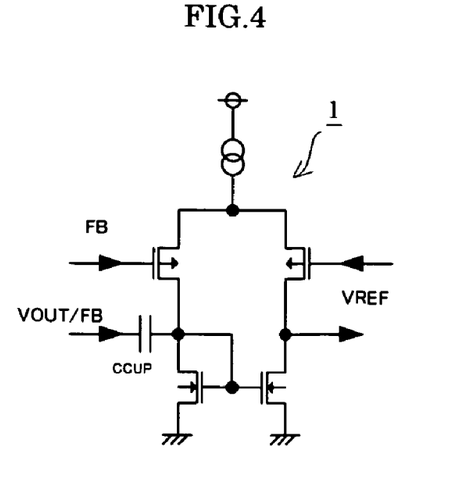
FIG. 4 is a circuit diagram showing a first modification of the error amplifier portion shown in FIG. 1.
Figure 5:
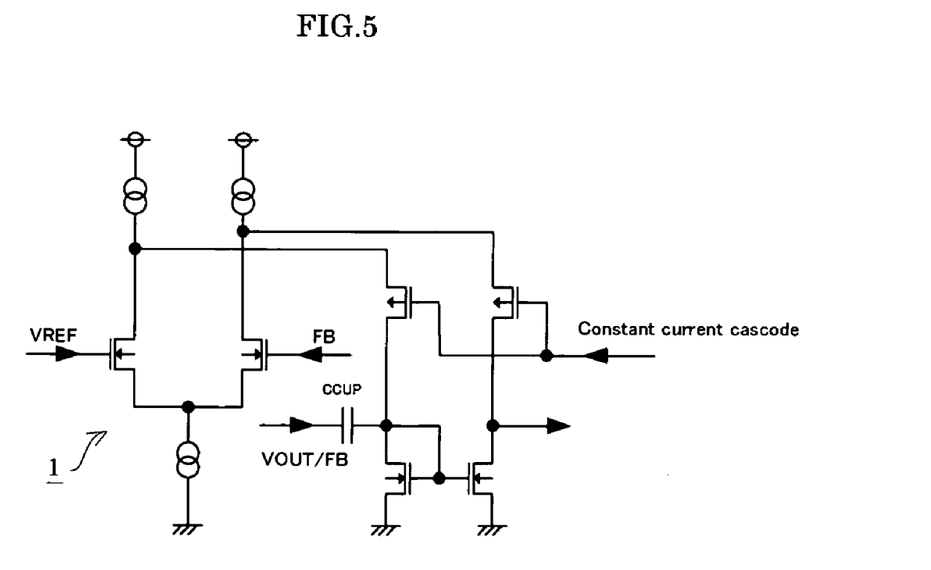
FIG. 5 is a circuit diagram showing a second modification of the error amplifier portion shown in FIG. 1.

The circuits shown in FIGS. 1 and 2 use the transconductance amplifier as the error amplifier 1, but this is not limitative. If the feedback signal VOUT/FB is capacitively coupled via the coupling capacitor CCUP, similar actions and effects are obtained even with an ordinary error amplification circuit as shown in FIG. 4, or a folded cascode amplifier as shown in FIG. 5.

Figure 6:
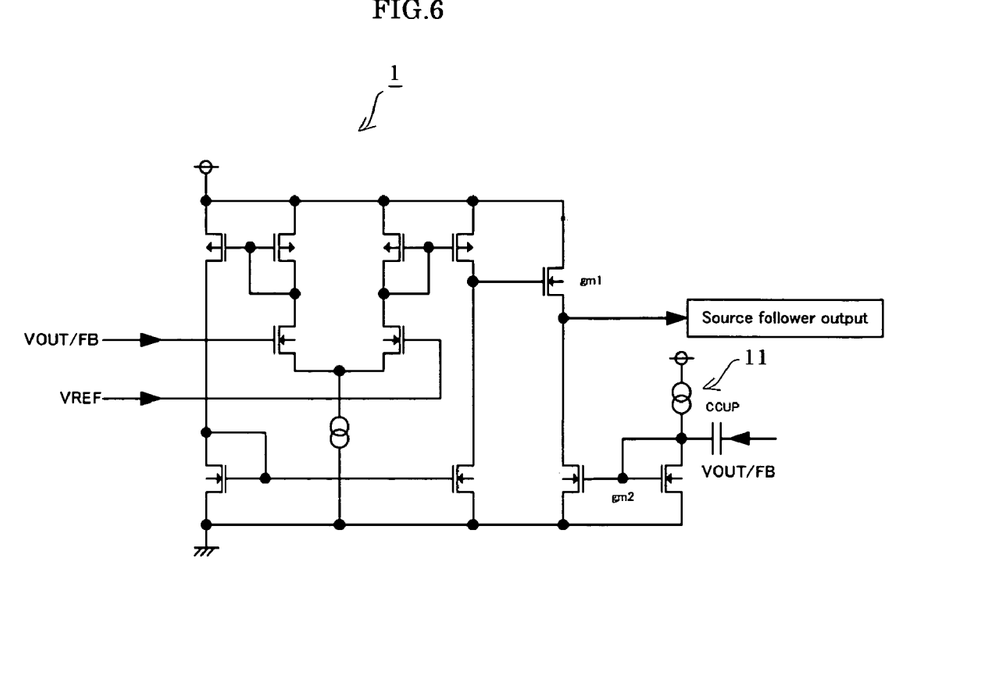
FIG. 6 is a circuit diagram showing a modification in which an output from the error amplifier portion shown in FIG. 1 is given as an output from a source follower circuit.
Figure 7:
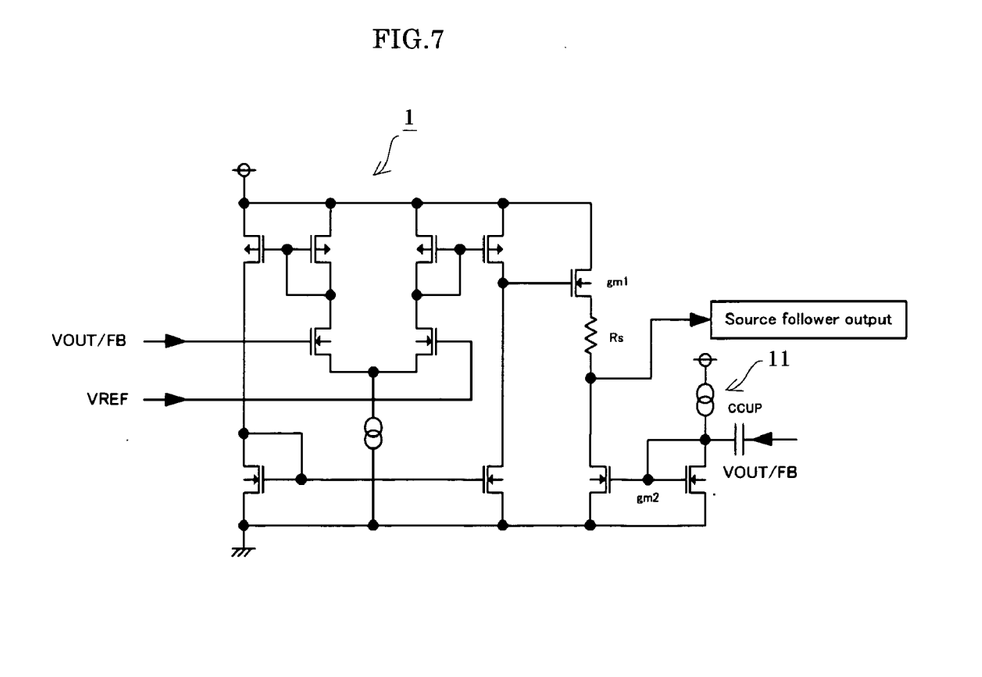
FIG. 7 is a circuit diagram showing a further modification of the circuit of FIG. 6.

Even when the output of an error amplifier 1 is issued as the output of a source follower circuit, namely, even with the use of a source follower circuit to be loaded by a constant current source 11 using a current mirror circuit, as shown in FIG. 6, similar actions and effects are obtained, if a feedback signal VOUT/FB is capacitively coupled to an N-channel MOS transistor on the saturated coupling side of the current mirror circuit of the source follower circuit via a coupling capacitor CCUP. In this case, a gain Azcp can be controlled by adding a resistance Rs between the source and the source follower output of the source follower circuit, as shown in FIG. 7. The gain Azcp is expressed by the following equation (11):

$$Azcp = gm2 \times (Rs + 1/gm1) \quad (11)$$
$$\cong gm2 \times Rs$$

EXAMPLE 1

<Phase Compensation of DC-DC Converter>

Figure 8:
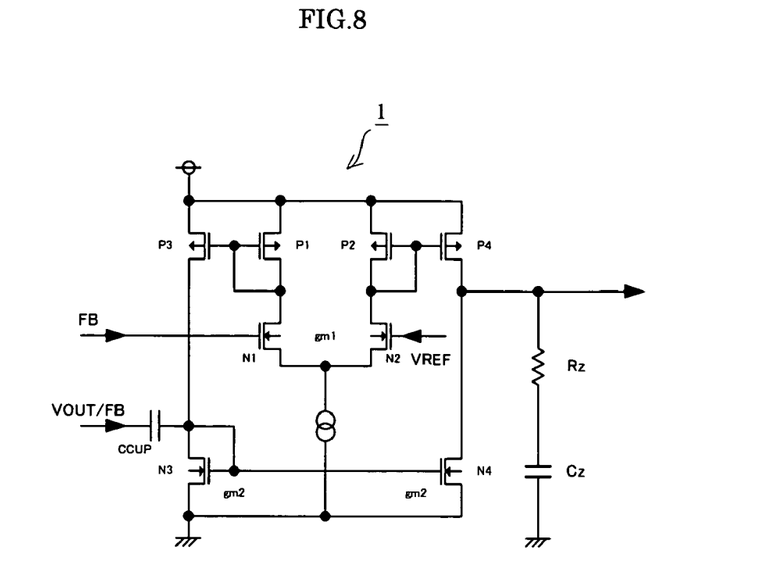
FIG. 8 is a circuit diagram showing the first embodiment of the present invention as applied to phase compensation of a DC-DC converter.

When phase compensation of a DC-DC converter according to the present embodiment is to be implemented, a circuit as shown in FIG. 8 is constructed by combining therewith the phase compensation according to the prior art (see FIG. 12). A zero-point frequency fz based on a resistance Rz and a capacitor Cz in FIG. 8 is set to be a sufficiently low frequency as compared with the zero-point frequency fzcp. By so doing, the gain characteristics of the error amplifier 1 are as indicated by the following equations (12) and (13):

$$Az = gm \times Rz (fz \leq f \leq fzcp) \quad (12)$$

$$Az = gm \times Rz + gm2 \times Rz (fzcp \leq f) \quad (13)$$

Figure 9:
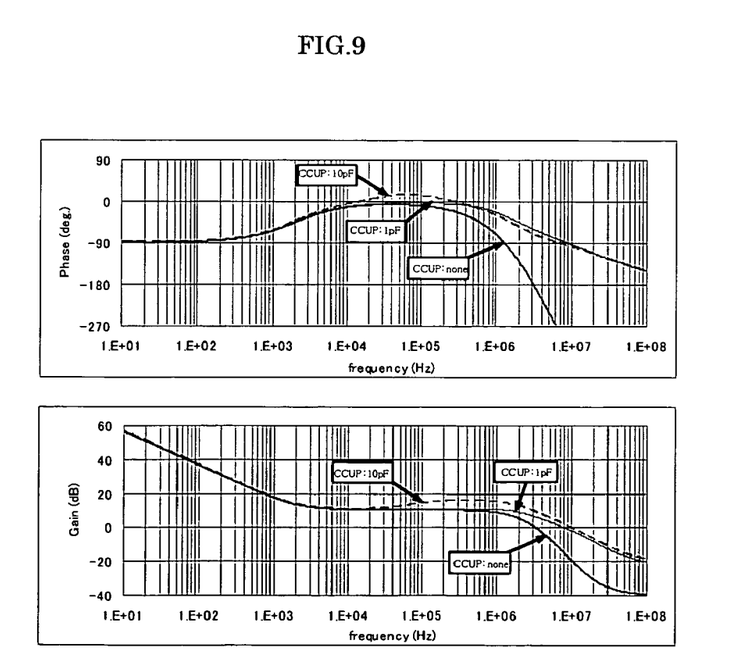
FIG. 9 is a Bode diagram showing the phase and gain characteristics of the circuit of FIG. 8.

The Bode diagram at this time is shown in FIG. 9.

EXAMPLE 2

<Phase Compensation of Voltage Regulator Using Three-stage Amplification Method>

Figure 10:
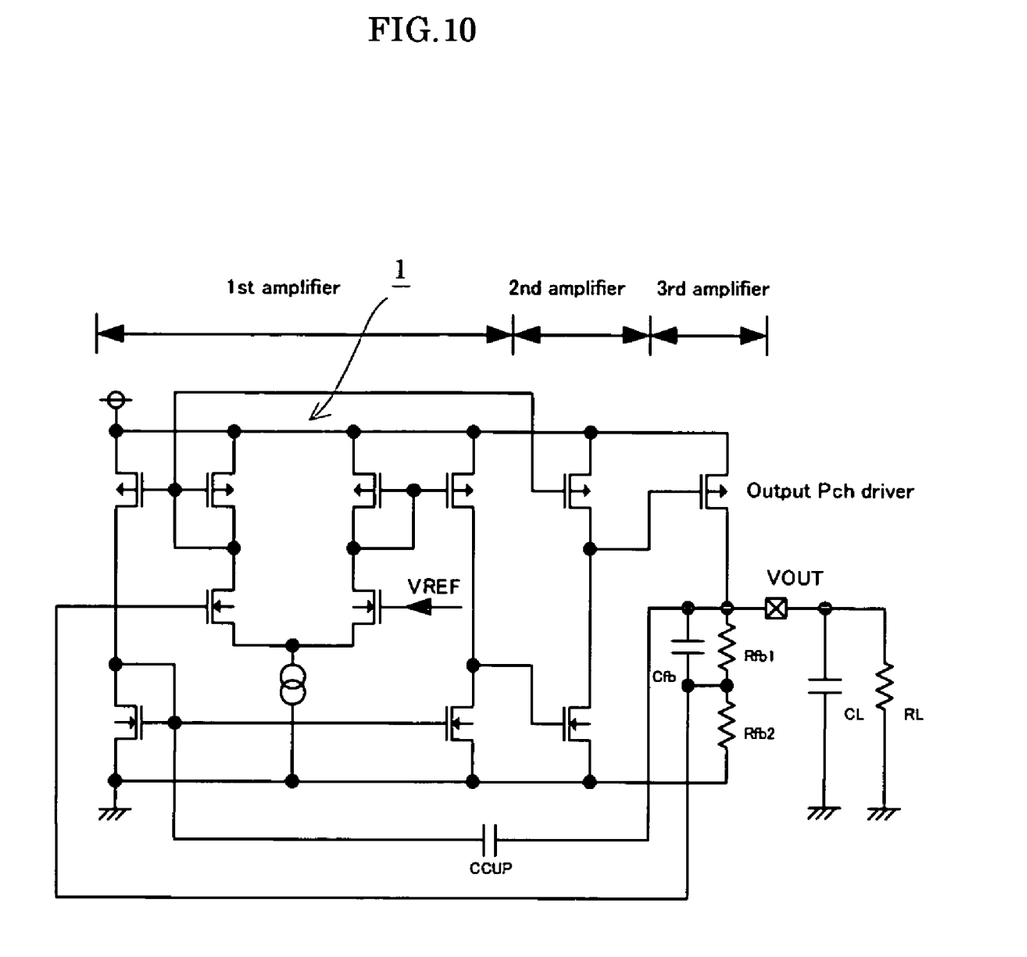
FIG. 10 is a circuit diagram showing the first embodiment of the present invention as applied to phase compensation of a voltage regulator using a three-stage amplification method.

As shown in FIG. 10, feedback from an output voltage VOUT into an error amplifier 1 is given directly. As a result, a zero-point frequency fzcp is added to a high frequency region. Thus, the zero-point frequency fzfb of a voltage regulator using a three-stage amplification method according to the prior art is set on the low frequency side. Hence, an ample phase margin can be obtained even in the circuit adopting the three-stage amplification method. By setting the zero-point frequency fzfb in the low frequency region, PSRR characteristics can also be improved.

The present invention as described above can be used in industrial fields in which power circuits of electronic equipment, such as a DC-DC converter or a voltage regulator, are manufactured and sold.

Although the embodiments of the present invention have been described above, the present invention is not limited to these embodiments. It should be understood that such changes, substitutions and alterations can be made therein without departing from the spirit and scope of the invention as defined by the appended claims.

What is claimed is:

1. A power circuit which compares a feedback signal based on an output voltage with a preset reference signal by an error amplifier to output a predetermined voltage, and
    wherein the feedback signal is supplied to a transistor on a saturated coupling side of a current mirror circuit inside the error amplifier from a coupling capacitor.

2. The power circuit according to claim 1, wherein the coupling capacitor is connected to the transistor on the saturated coupling side via a resistance.

3. The power circuit according to claim 1, wherein a signal comprising a voltage converted from information on a current flowing in an output driver is used as the feedback signal.

4. The power circuit according to claim 1, wherein the coupling capacitor is disposed separately from the transistor inside the error amplifier.

5. The power circuit according to claim 1, wherein the drain and the gate of the transistor are short-circuited.

6. The power circuit according to claim 1, wherein a terminal of the coupling capacitor is connected to the gate of the transistor.

7. The power circuit according to claim 1, wherein the resistance includes a resistor with a first terminal and a second terminal, and that a terminal of the coupling capacitor is connected to the first terminal of the resistor, and the second terminal of the resistor is connected to the gate of the transistor.

* * * * *